G. WILSON.
FOOT LEVER.
APPLICATION FILED APR. 11, 1911.

1,086,111.

Patented Feb. 3, 1914.

Witnesses:

Inventor:

UNITED STATES PATENT OFFICE.

GEORGE WILSON, OF ROCKFORD, ILLINOIS, ASSIGNOR TO EMERSON-BRANTINGHAM COMPANY, OF ROCKFORD, ILLINOIS, A CORPORATION OF ILLINOIS.

FOOT-LEVER.

1,086,111. Specification of Letters Patent. Patented Feb. 3, 1914.

Application filed April 11, 1911. Serial No. 620,417.

*To all whom it may concern:*

Be it known that I, GEORGE WILSON, a citizen of the United States, residing at Rockford, in the county of Winnebago and State of Illinois, have invented certain new and useful Improvements in Foot-Levers, of which the following is a specification.

The object of this invention is to produce a foot lever for tilting the inner shoe in order to point the guards downward to get under the grass, or upward if deemed necessary.

Figure 1:
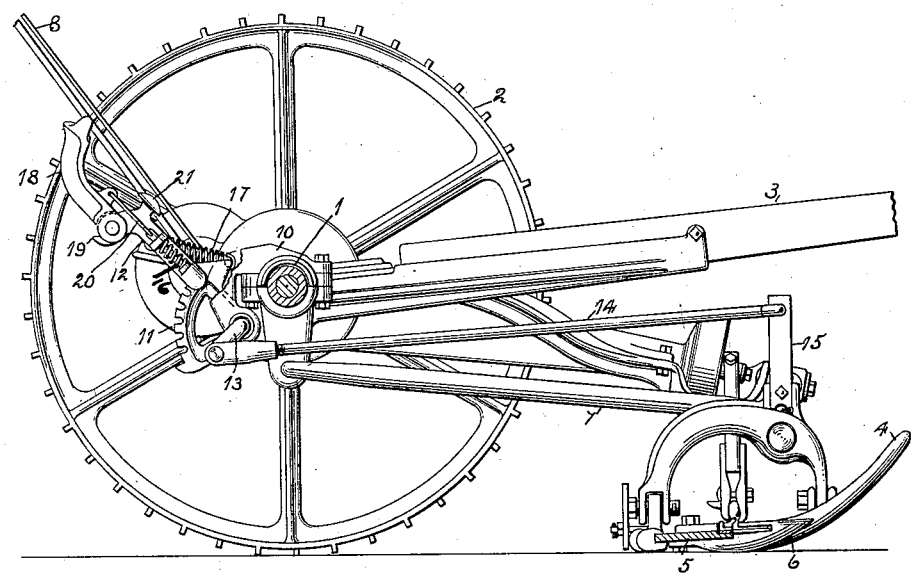
Figure 2:
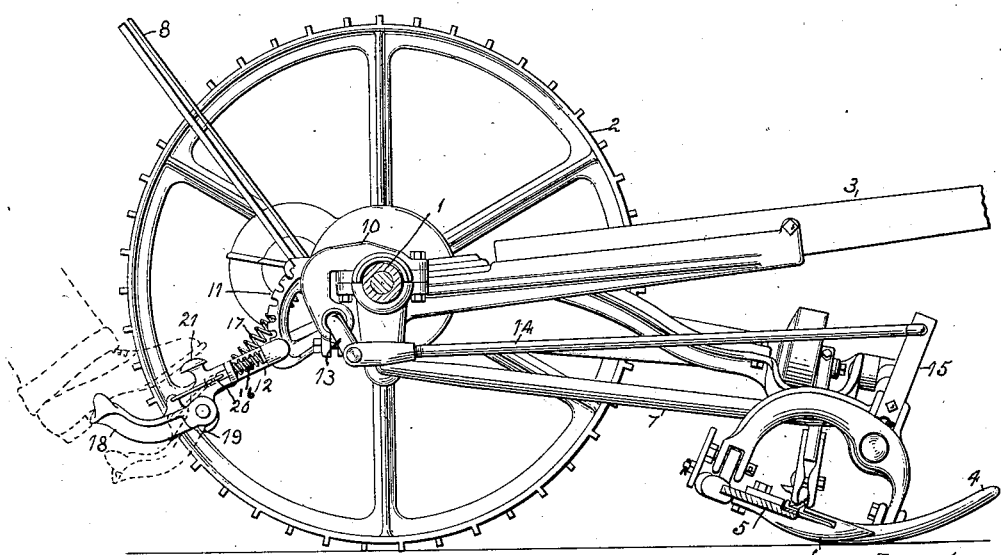

In the accompanying drawings. Figure 1 is a vertical section longitudinally through a mowing machine embodying my improvements, in which the cutter bar is in a horizontal position. Fig. 2 is a similar section in which the cutter bar is tipped forward.

The mowing machine in the drawing is of a well known construction and comprises the frame 1, wheels 2, tongue 3, inner shoe 4, cutter bar 5, guards 6, push bar 7, and seat support 8 to which is secured a seat (not shown). To the frame 1 is secured a bracket 10 supporting a toothed segment 11 at its inner end. A foot lever 12 is pivotally supported by the bracket and has a bent end forming a crank 13. To this crank is pivotally connected a rod 14 which extends forward and connects with a bar 15 rigidly connected to the inner shoe 4. The foot lever 12 supports a spring actuated dog 16 adapted to engage the toothed segment 11. A spring 17 has one end connected with the foot lever and its other end is connected to the toothed segment 11. A foot treadle 18 is pivotally connected to the foot lever and adapted to contact with the stop 19. A rod 20 forms a connection between the dog 16 and the foot treadle. A toe rest 21 is formed as part of the foot lever.

The operator mounted in the seat places his foot on the treadle and depresses it which will withdraw the dog from engagement with the toothed segment and contact with the stop 19. A further downward movement of the foot will carry the foot lever with it, which will rock the crank 13, and force the rod 14 forward thereby tilting the inner shoe 4, and the guides 6 carried by it downward as shown at Fig. 2. In order to hold the inner shoe in this position, the operator places the toe of his foot on the toe rest 21, and releases the treadle so that the dog will engage the toothed segment, when the operator can remove his foot and continue the cutting with the inner shoe in its tipped position. To allow the shoe to assume a horizontal or normal position, the operator presses down on the treadle with his foot to withdraw the dog from its engagement with the toothed segment and the spring 17 will raise the foot lever into its uppermost position as shown at Fig. 1. By thus controlling the action of the cutting apparatus by the foot, it leaves the hands free to manage the team.

I claim as my invention.

1. The combination of a toothed-segment, a lever having a pivotal connection therewith and being formed with a toe-rest and a stop at its free end, a spring actuated dog supported by the lever and adapted to engage the segment, a treadle pivotally supported by the lever and having a connection with said dog, the treadle adapted to contact with the stop and simultaneously disengage the dog from said toothed-segment to swing the lever, and the toe rest forming means to hold the lever fixed while the treadle is actuated to engage the dog with the toothed segment.

2. The combination of a toothed segment, a lever having a pivotal connection therewith, and having a stop and a toe rest at the free end of the lever, a dog and a spring for holding the dog into engagement with said toothed segment, a treadle pivoted to the lever intermediate said stop and toe-rest and having a connection with said dog, the actuation of the treadle disengaging the dog from the toothed segment and contacting the stop thereby swinging the lever, the toe-rest forming fixed means by which the lever is held stationary while the treadle is actuated to engage the dog in the toothed segment.

3. The combination of a toothed segment, a lever having a pivotal connection therewith, a treadle pivoted to the free end of the lever, a slidable dog carried by the lever and adapted to engage said toothed segment, the treadle having a foot-rest at its free end and the lever having a toe-rest, and a stop on the lever for the treadle to contact, the actuation of the treadle through the foot-rest releasing the dog from its engagement with the toothed segment to allow the treadle to contact the stop and swing the lever, the toe-rest forming means to hold the lever from movement while the treadle is actuated to engage the dog in the toothed segment.

4. The combination of a toothed segment, a lever having a pivotal connection therewith, and having a stop and a toe-rest at the free end of the lever, a treadle pivoted to the lever intermediate the stop and toe-rest and having a foot-rest at its free end, and a slidable dog carried by the lever, having a link connection with the treadle and adapted to engage the toothed segment, the actuating of the treadle disengaging the dog from the toothed segment and contacting the stop thereby swinging the lever, the toe-rest forming a means to hold the lever from movement while the treadle is actuated to engage the dog in the toothed segment.

In testimony whereof I have hereunto set my hand in presence of two subscribing witnesses.

GEORGE WILSON.

Witnesses:
A. O. BEHEL,
E. D. E. N. BEHEL.

Copies of this patent may be obtained for five cents each, by addressing the "Commissioner of Patents, Washington, D. C."